(12) United States Patent
Andriani

(10) Patent No.: US 6,656,074 B2
(45) Date of Patent: Dec. 2, 2003

(54) CRAWLER VEHICLE TRANSMISSION-STEERING ASSEMBLY

(75) Inventor: Antimo Massimiliano Andriani, Bari (IT)

(73) Assignee: New Holland North America, Inc., New Holland, PA (US)

( * ) Notice: Subject to any disclaimer, the term of this patent is extended or adjusted under 35 U.S.C. 154(b) by 69 days.

(21) Appl. No.: 10/087,333

(22) Filed: Mar. 1, 2002

(65) Prior Publication Data

US 2002/0166676 A1 Nov. 14, 2002

(51) Int. Cl.[7] .............................................. B62D 11/06
(52) U.S. Cl. ............................ 475/28; 475/18; 180/6.2
(58) Field of Search ..................... 475/18, 28; 180/6.2, 180/6.24

(56) References Cited

U.S. PATENT DOCUMENTS 3,698,498 A * 10/1972 Stanford ..................... 180/6.2
4,803,897 A * 2/1989 Reed ............................ 475/28
5,195,600 A * 3/1993 Dorgan ....................... 180/6.2

* cited by examiner

Primary Examiner—Dirk Wright
(74) Attorney, Agent, or Firm—John William Stader; Rebecca L. Henkel

(57) ABSTRACT

A transmission-steering assembly for a crawler vehicle has a propeller shaft and two output shafts extending along a transverse axis of the vehicle. The two output shafts drive respective tracks of the vehicle, and are driven by the propeller shaft via the interposition of respective identical reduction units. A power-steering device is interposed between the output shafts to vary the relative angular speed of the output shafts. The assembly has a single service brake for exerting, in use, a braking action on the propeller shaft, and a single auxiliary parking brake associated with the steering device.

11 Claims, 2 Drawing Sheets

CRAWLER VEHICLE TRANSMISSION-STEERING ASSEMBLY

BACKGROUND OF THE INVENTION

The present invention relates generally to earthmoving equipment, such as a bulldozer, and, more particularly, to a crawler vehicle transmission-steering assembly.

As is known, crawler vehicles comprise a pair of lateral tracks powered by a transmission comprising an input shaft driven by a hydraulic or other type of motor; two opposite, coaxial output shafts connected to respective track drive wheels; and two identical lateral reduction units, each interposed between the input shaft and a respective output shaft.

Each output shaft normally is connected to a service brake and clutch, which are controlled independently by a control unit to steer the vehicle. More specifically, steering is effected by disconnecting one of the drive wheels from the transmission by means of the associated clutch, and by braking the disconnected drive wheel while continuing to transmit torque to the other.

A major drawback of known crawler vehicle steering systems of the type described above lies in the steering control turning the vehicle sharply and producing uncontrolled lateral jerking, mainly on account of one of the tracks, when steering the vehicle, being disconnected from the motor or engine.

To eliminate the above drawback, a transmission-steering assembly without the two clutches is used, and which comprises a differential train connecting the two lateral reduction units and which is powered by a further hydraulic motor to vary the relative speed of the two tracks, possibly in conjunction with the braking action of the two service brakes on the respective output shafts.

The above known assembly defines a continuous differential or so-called power-steering system by which the drive wheels are connected permanently to the input shaft, thus enabling smooth, accurate steering of the vehicle.

Such an assembly, however, is unsuitable for small crawler vehicles with a power of e.g. less than 100 kW. Indeed, comprising an extremely large number of component parts, a transmission-steering assembly of the above type is relatively expensive and, above all, bulky, particularly along the output shaft axis.

SUMMARY OF THE INVENTION

It is therefore an object of the present invention to provide a crawler vehicle transmission-steering assembly designed to provide a straightforward, low-cost solution to the aforementioned drawbacks.

According to a first aspect of the present invention, there is provided a transmission-steering assembly for a crawler vehicle comprising two lateral tracks; the assembly having a transmission axis, and comprising a propeller shaft extending along said transmission axis; two output shafts extending along said transmission axis and each for driving a respective said lateral track; two reduction units, each interposed between said propeller shaft and a respective said output shaft; power steering apparatus interposed between said output shafts to vary the relative angular speed of the output shafts; and braking device for braking said output shafts.

The transmission-steering assembly is characterized in that said braking device comprise a single service brake exerting, in use, a braking action on said propeller shaft.

According to a second aspect of the present invention, there is provided a crawler vehicle having a transmission-steering assembly with the characteristics as presented hereabove.

These and other objects, features and advantages are accomplished according to the instant invention in which a transmission-steering assembly for a crawler vehicle has a propeller shaft and two output shafts extending along a transverse axis of the vehicle. The two output shafts drive respective tracks of the vehicle, and are driven by the propeller shaft via the interposition of respective identical reduction units. A power-steering device is interposed between the output shafts to vary the relative angular speed of the output shafts. The assembly has a single service brake for exerting, in use, a braking action on the propeller shaft, and a single auxiliary parking brake associated with the steering device.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
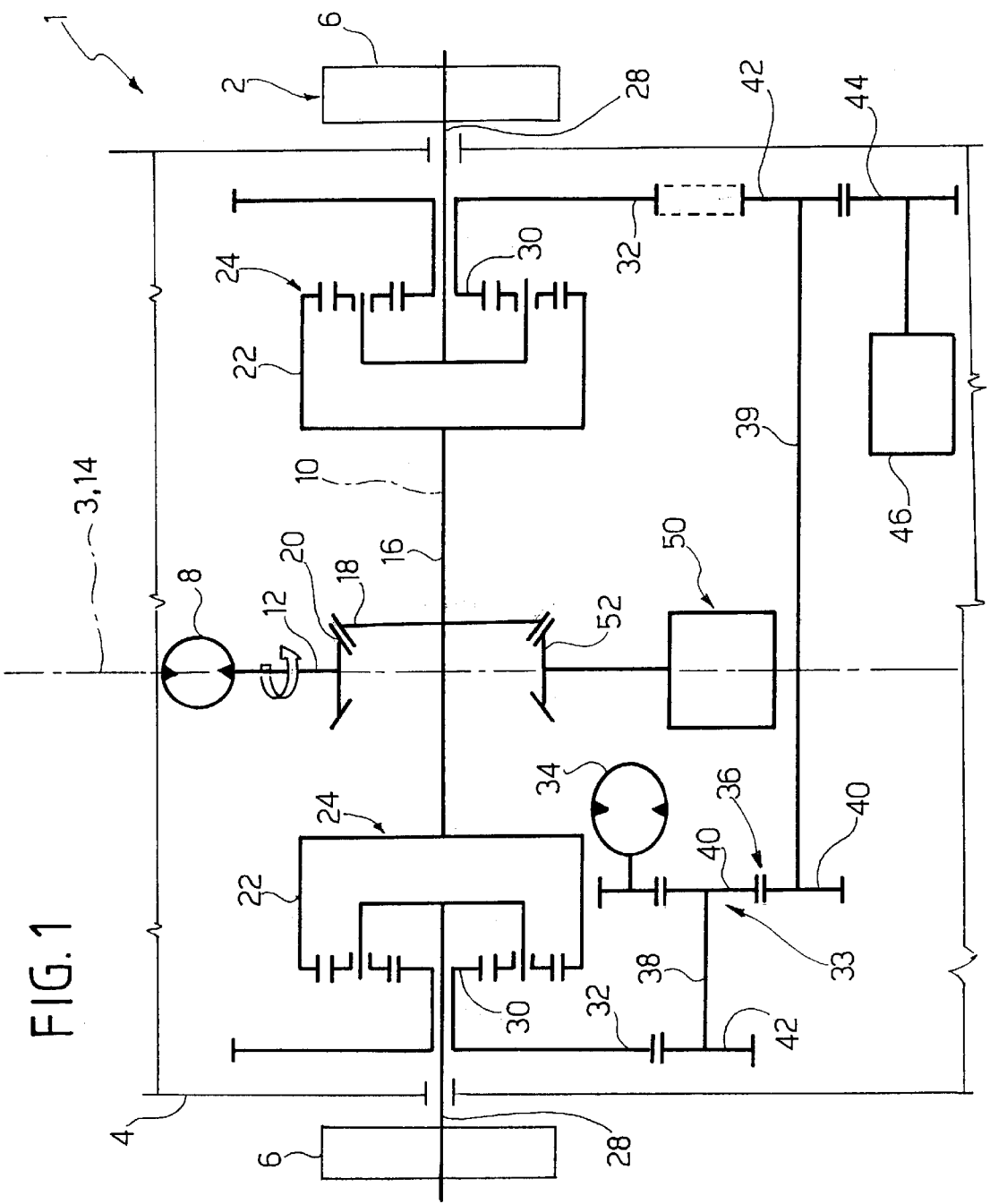
FIG. 1 shows an operating diagram of a preferred embodiment of the crawler vehicle transmission-steering assembly according to the present invention.
Figure 2:
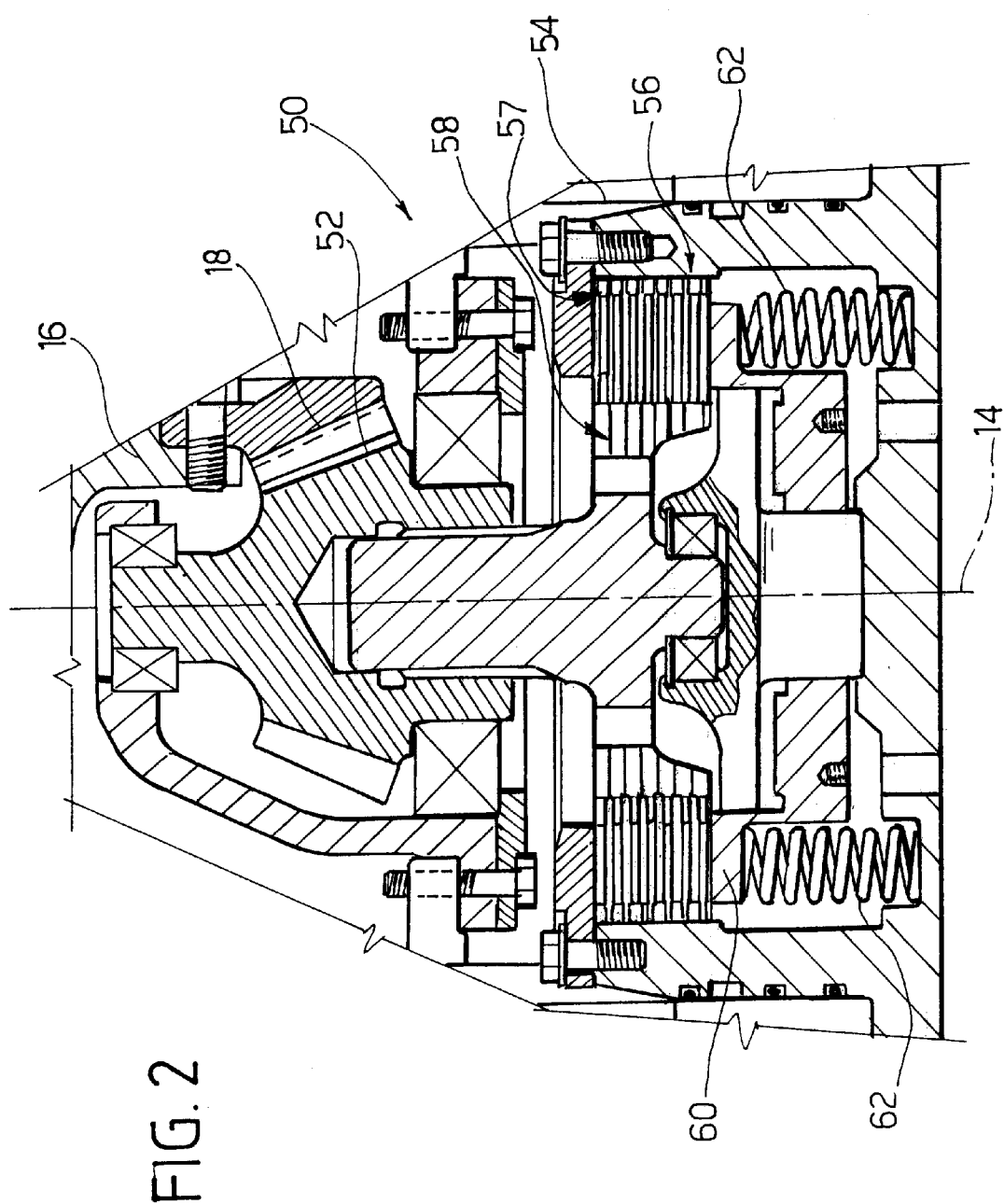
FIG. 2 shows a larger-scale section of a detail of the FIG. 1 assembly.

With reference to FIGS. 1 and 2, Reference number 1 in FIG. 1 indicates a transmission-steering assembly (shown schematically) for a crawler vehicle 2 (shown partly and schematically) used, in particular, as an earth-moving or construction machine.

Vehicle 2 has a longitudinal orientation 3, and comprises a frame 4 and two longitudinal tracks (not shown) located on opposite sides of frame 4 and looped about respective rear drive wheels 6 (shown only schematically).

Wheels 6 are powered by a hydraulic or other type of motor 8, via the interposition of assembly 1, to rotate, with respect to frame 4, about a transverse axis 10 perpendicular to direction 3. Assembly 1 is housed in a transmission case (not shown), and comprises a powered shaft 12 having an axis 14 perpendicular to axis 10. Shaft 12 is powered by motor 8 to rotate about said axis 14. Assembly 1 further comprises a propeller shaft 16 extending along axis 10 and rotated by shaft 12 about axis 10 by means of a pair of bevel gears 18, 20 meshing with each other and integral with shafts 16 and 12 respectively.

Shaft 16 integrally connects the two ring gears 22 of two identical known epicyclic reduction units 24 located at opposite ends of shaft 16 and forming part of assembly 1. Reduction units 24 transmit motion to the wheels 6 via respective output shafts 28 extending in opposite directions along axis 10 and each connected integrally to a respective wheel 6.

The reduction units 24 comprise respective sun gears 30 integral with a respective toothed gear wheel 32 rotated in opposite directions about axis 10 by a known, continuous, differential steering device 33 forming part of assembly 1 and comprising a hydraulic motor 34 and a differential gear train 36. More specifically, gear train 36 comprises two counter-rotating shafts 38, 39 parallel to axis 10 and fitted, at a first end, with respective gears 40 meshing with each other and rotated by motor 34, and, at a second end, with respective gears 42, each meshing directly with a respective gear wheel 32 of reduction units 24. For the sake of simplicity, shafts 38, 39 and 16 are shown schematically in FIG. 1 as though lying in the same plane, though in actual fact they lie in different planes.

Gear 42 of shaft 39 also meshes with a pinion 44 fitted to a relatively small auxiliary parking brake 46 (not described in detail) located on the opposite side of shaft 39 to shaft 16 and for braking pinion 44, and therefore sun gears 30 of reduction units 24, when parking vehicle 2.

With reference to FIGS. 1 and 2, assembly 1 additionally comprises a single service disk brake 50 extending along axis 14 and located diametrically opposite shaft 12 with respect to shaft 16. The brake 50 is located in an intermediate position between reduction units 24 and is fitted with a bevel pinion 52, coaxial with bevel gear 20, and meshing with bevel gear 18.

Brake 50 comprises a housing 54 fitted integrally to the transmission case. An axial pack of brake disks 56 is housed in housing 54 and comprises a first number of disks connected in angularly fixed manner to an inner lateral portion 57 of housing 54, and a second number of disks interposed between those of the first number and connected in angularly fixed manner to pinion 52 by means of an axial pin 58.

Brake 50 also comprises a cup-shaped body 60, which is housed in housing 54, slides axially to and from the pack of disks 56, and is activated axially by an actuator (not shown) controlled by the driver of vehicle 2, and by elastic members 62 interposed between housing 54 and body 60 to keep disks 56 packed together and therefore in the braking condition in the absence of control by the actuator.

When brake 50 is operated, braking action is exerted directly on pinion 52 and therefore on shafts 16 and 12. Brake 50 exerts the same braking torque on both ring gears 22 of reduction units 24, and therefore on both wheels 6, and so provides for slowing vehicle 2 with no steering action, which is performed solely by device 33.

Indeed, the torque supplied by motor 34 of device 33 is transmitted by gear train 36 in equal opposite parts to the two sun gears 32 and, therefore, to the two shafts 28 to vary the relative angular speed of shafts 28, and is sufficient to vary the relative angular speed with no need for a brake on shafts 28. At the same time, when not actuated to steer vehicle 2, motor 34 is braked hydraulically by its own hydraulic supply circuit (not shown) and therefore is prevented from being run by external torque coming from e.g. the wheels 6, thus preventing wheels 6 from turning accidentally in opposite directions.

When parking vehicle 2, brake 46 provides for mechanically locking gear train 36 and motor 34, in particular to prevent relative rotation of wheels 6 in opposite directions, caused by minor leakage of motor 34 or the hydraulic supply circuit of motor 34. Contemporarily, brake 46 acts as a safety device in the event of leakage caused by a fault on motor 34 or the hydraulic supply circuit of motor 34.

Assembly 1 thus prevents accidental counter-rotation, not controllable by brake 50, of wheels 6 and consequently of the tracks of vehicle 2 when parking on steep, rough ground.

As compared with known solutions featuring a brake for each wheel 6, assembly 1 is therefore much more compact and may therefore also be installed on relatively small vehicles 2 with a power of less than 100 kW.

Using a single service brake 50, in fact, co-operating with propeller shaft 16 and, in particular, installed between reduction units 24, provides for reducing the size of assembly 1, particularly axially between reduction units 24 and wheels 6. Also by means of using a single service brake 50, assembly 1, unlike known solutions, requires no complex control assemblies for independently controlling the two brakes connected to the track drive wheels so as to perform both vehicle braking and steering functions.

As compared with known solutions, assembly 1 therefore has a smaller number of component parts and is cheaper to produce. The particular type of brake 50 and the location and connection of brake 50 to bevel gear 18 also contribute towards greatly reducing the size of assembly 1.

Being straightforward in design, in terms of compactness and the relatively small number of component parts involved, assembly 1 is also relatively easy to maintain.

Nor are the above advantages compromised by the provision of brake 46, which, in fact, is installed some distance from axis 10 and, above all, is smaller than brake 50 and normal service brakes by being used solely for parking vehicle 2.

Clearly, changes may be made to transmission-steering assembly 1 as described herein without, however, departing from the scope of the present invention.

In particular, brake 50 may be of a different type from the one described, may be located in a position different from the one shown, and/or may co-operate directly with shaft 16. Also, brake 46 may be connected to device 33 in a position other than as shown, and/or may be integrated in motor 34.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a transmission-steering assembly for a crawler vehicle having two lateral tracks; a transmission axis; a propeller shaft extending along said transmission axis; two output shafts extending along said transmission axis and each for driving a respective said lateral track; two reduction units, each interposed between said propeller shaft and a respective said output shaft; a power steering apparatus interposed between said output shafts to vary the relative angular speed of the output shafts; and a braking device for braking said output shafts, the improvement comprising:

said braking device including a single service brake exerting, in use, a braking action on said propeller shaft.

2. The transmission-steering assembly of claim 1 wherein said service brake is located in an intermediate position between said reduction units.

3. The transmission-steering assembly of claim 2 wherein said service brake extends along an axis orthogonal to said transmission axis.

4. The transmission-steering assembly of claim 3 further comprising:

a transmission interposed between said service brake and said propeller shaft.

5. The transmission-steering assembly of claim 4 wherein said transmission comprises:

a first gear integral with said propeller shaft;

a second gear meshing with said first gear and carried by said service brake; and a powered third gear, meshing with said first gear, being provided to transmit motion to said propeller shaft.

6. The transmission-steering assembly of claim 5 wherein said second and said third gear are located in diametrically opposite positions with respect to said transmission axis.

7. The transmission-steering assembly of claim 5 wherein said service brake comprises a movable braking body, said transmission-steering assembly further comprising:

an elastic member for exerting thrust on said movable braking body to exert said braking action on said propeller shaft in the absence of control of the service brake.

8. The transmission-steering assembly of claim 7 wherein said service brake is an axial disk brake.

9. The transmission-steering assembly of claim 8 further comprising:

a single auxiliary brake for parking said crawler vehicle, said auxiliary brake being associated with said steering apparatus.

10. The transmission-steering assembly of claim 9 wherein said auxiliary brake co-operates with said steering apparatus.

11. The transmission-steering assembly of claim 10 wherein said steering apparatus comprise a differential gear train parallel to said propeller shaft; said auxiliary brake exerting, in use, a braking action on said differential gear train, and being located on the opposite side of the differential gear train to said propeller shaft.

* * * * *